(12) United States Patent
Cheon et al.

(10) Patent No.: US 9,635,561 B2
(45) Date of Patent: Apr. 25, 2017

(54) METHOD AND SYSTEM OF DISTRIBUTED SENSING FOR REDUCING SPECTRUM SENSING OVERHEAD IN COGNITIVE WIRELESS MULTI-HOP NETWORKS

(71) Applicants: ELECTRONICS AND TELECOMMUNICATIONS RESEARCH INSTITUTE, Daejeon (KR); AJOU UNIVERSITY INDUSTRY-ACADEMIC COOPERATION FOUNDATION, Suwon-si, Gyeonggi-do (KR)

(72) Inventors: Kyung Yul Cheon, Daejeon (KR); Chang Joo Kim, Daejeon (KR); Young Bae Ko, Suwon-si (KR); Jae Beom Kim, Suwon-si (KR)

(73) Assignees: ELECTRONICS AND TELECOMMUNICATIONS RESEARCH INSTITUTE, Daejeon (KR); AJOU UNIVERSITY INDUSTRY-ACADEMIC COOPERATION FOUNDATION, Suwon-si, Gyeonggi-Do (KR)

( * ) Notice: Subject to any disclaimer, the term of this patent is extended or adjusted under 35 U.S.C. 154(b) by 247 days.

(21) Appl. No.: 14/540,194

(22) Filed: Nov. 13, 2014

(65) Prior Publication Data

US 2015/0223187 A1    Aug. 6, 2015

(30) Foreign Application Priority Data

Feb. 6, 2014   (KR) .................... 10-2014-0013408

(51) Int. Cl.
*H04W 64/00* (2009.01)
*H04W 16/14* (2009.01)
*H04W 24/10* (2009.01)

(52) U.S. Cl.
CPC ............ *H04W 16/14* (2013.01); *H04W 24/10* (2013.01)

(58) Field of Classification Search
CPC ...... H04W 64/00; H04W 24/08; H04W 48/16
See application file for complete search history.

(56) References Cited

U.S. PATENT DOCUMENTS 8,779,919 B1 * 7/2014 Darling .................. H04W 4/22
340/539.16
2010/0197332 A1    8/2010 Kyperountas et al.
(Continued)

FOREIGN PATENT DOCUMENTS

KR    10-1083117 B1    11/2011

OTHER PUBLICATIONS

Jae Beom Kim et al., "CoCoMRP: Cooperative Channel Sensing based Cognitive Multicast Routing Protocol for Ad Hoc Networks", The 40th regular meeting order and Fall Conference, Nov. 15, 2013, The Korean Institute of Information Scientists and Engineers, Jeju-do, Republic of Korea.
(Continued)

*Primary Examiner* — Wei Zhao
(74) *Attorney, Agent, or Firm* — LRK Patent Law Firm

(57) ABSTRACT

The present invention provides a method and system for performing distributed channel sensing in which channel information is collected by performing channel sensing according to a channel sensing priority which is determined according to a relative position of a cell to which a wireless connection device belongs from among a plurality of cells which logically partition the zone of the wireless network, and thus the overhead of the channel sensing which is generated in a cognitive wireless multi-hop network envi-
(Continued)

ronment is reduced, and the transmission failure which occurs when the wireless connection device detects frequencies is reduced.

20 Claims, 8 Drawing Sheets

(56) References Cited

U.S. PATENT DOCUMENTS

2013/0335237 A1* 12/2013 Zarka ............... G08G 1/096716
340/905
2014/0222572 A1* 8/2014 Ryu .................. G06Q 30/0261
705/14.58

OTHER PUBLICATIONS

Jae-Kark Choi et al., "Distributed Fair Sensing Scheme based on Sensing Zone in Cognitive Radio Ad-hoc Networks", The Journal of Korean Institute of Communications and Information Sciences, '10-03 vol. 35, No. 3, Feb. 2010, Seoul, Republic of Korea.

* cited by examiner

METHOD AND SYSTEM OF DISTRIBUTED SENSING FOR REDUCING SPECTRUM SENSING OVERHEAD IN COGNITIVE WIRELESS MULTI-HOP NETWORKS

Priority to Korean patent application number 2014-0013408 filed on Feb. 6, 2014, the entire disclosure of which is incorporated by reference herein, is claimed.

BACKGROUND OF THE INVENTION

1. Field of the Invention

The present invention relates to a channel sensing method, and more particularly, to a channel sensing method in a wireless multi-hop network.

2. Discussion of the Related Art

Periodic channel sensing or spectrum sensing of each node which forms a network is a frequently found scheme in an environment which uses cognitive radio or a cognitive wireless multi-hop environment, and is used to detect the state of a primary user or channel which exists in a network and to select the used channel of neighboring nodes or all nodes within the network based on the information.

The channel sensing may be divided into in-band and out-of-channel channel scanning sections, and the in-band channel scanning section is a section where each node senses the node's own channel. The channel sensing at the in-band channel scanning section detects the frequency's user by temporarily stopping communication and sensing the channel which is being used. In the out-of-band channel scanning section, channel sensing refers to a process of sensing the channel band which is not used by the current node, and because network nodes do not use the channel unlike channel sensing in the in-band scanning section, communication is not stopped.

A cognitive radio network device repeatedly performs the above explained in-band and out-of-band scanning processes at regular intervals. As such, the cognitive radio network device shares a channel which is not used by the main user of the frequency. The cognitive radio network device performs communication by using a common channel which is shared between neighboring nodes as an active channel.

For example, referring to IEEE 802.22 WRAN standard for WLAN communication in a TV white space, each node is configured to periodically sense the channel, and the scanning time is divided into an inter-frame sensing section which scans the channel during a n-frame transmission period and an intra-frame sensing section which scans the channel during a single frame time so as to minimize the sensing delay.

The channel sensing period is an element which evaluates accuracy of neighboring movement connection device information. If the sensing period time is used relatively long, the sensitivity on the search of the neighboring movement connection device is lowered. In contrast, if the sensing period is used short, the sensitivity for the channel information increases so as to quickly detect the change of the channel state such as the channel use of the main user. However, the short period time increases the transmission delay time of the network according to sensing, thereby causing the data transmission failure within the network or lowering the reliability on the network disconnection.

In particular, in a distributed network environment such as an wireless multi-hop network, all nodes participate in sensing and the nodes independently determine scanning time, etc. so as to form a network, thereby causing transmission rate decrease and transmission delay increase due to channel scanning.

As described above, the channel sensing scheme which obtains available channels by all nodes' participation in sensing in a cognitive radio environment reduces the data transmission efficiency of the entire network, and thus there is a need for minimizing the sensing delay time.

SUMMARY OF THE INVENTION

An object of the present invention is to provide a method and system of distributed sensing for reducing the channel sensing overhead which is generated in a cognitive wireless multi-hop network.

In accordance with an aspect of the present invention, a method of distributed channel sensing by a wireless connection device which belongs to a wireless network includes checking a zone of a network, to which the wireless connection device belongs, from among one or more zones which logically partition the wireless network, checking a cell, to which the wireless connection device belongs, from among a plurality of cells which logically partition the zone of the wireless network, determining a channel sensing priority according to a relative position of a cell, to which the wireless connection device belongs, in the zone to which the wireless connection device belongs, and collecting channel information by performing channel sensing according to the channel sensing priority.

Checking the cell to which the wireless connection device belongs may include checking the cell of the network to which the wireless connection device belongs by using geographical location information of the wireless connection device and geographical location information of the zone.

The zone may include 16 cells, and the cell may partition the zone by a 4×4 array within the zone.

A wireless connection device, which belongs an edge cell which is located in an apex area of the zone from among the cells, may have a highest sensing priority.

A wireless connection device, which belongs to a border cell which is adjacent to one of boundaries of the zone from among the cells, may have a second highest sensing priority followed by the wireless connection device which belongs to the edge cell, and the wireless connection device which belongs to the border cell performs channel sensing when the wireless connection device may not exist in a neighboring edge cell.

A wireless connection device, which belongs to an intra cell which is not adjacent to a boundary of the zone, from among the cells, may have a lowest sensing priority, and the wireless connection device may perform channel sensing when a wireless connection devices does not exist in the neighboring edge cell and the border cell.

A leader wireless connection device of the zone which is located geographically closest to a geographical center of the zone may transmit a channel information request message to other wireless connection devices which belong to the zone.

The leader wireless connection device of the zone may generate channel sensing information by using channel information which is received from another wireless connection device within the zone.

The leader wireless connection device may multicast the channel sensing information to at least one wireless connection device within the zone.

The wireless connection device, which receives the channel sensing information from the leader wireless connection device, may transmit the channel sensing information to another wireless connection device within the zone.

The size of the zone may be determined by using the sensing range of the wireless connection device.

The size of the cell may be determined by using the maximum transmission distance of the wireless connection device.

Collecting the channel information by performing channel sensing according to the channel sensing priority may include receiving a channel information request message from the leader wireless connection device of the zone, and collecting channel information by performing channel sensing according to the determined channel sensing priority.

Collecting channel information by performing channel sensing according to the channel sensing priority may include transmitting the collected channel information to the leader wireless connection device of the zone.

In accordance with another aspect of the present invention, a system for performing distributed channel sensing in a wireless network includes a sensing wireless connection device which is located within a predetermined geographical zone of a wireless network which logically partitions the wireless network, and collects channel information by performing channel sensing according to a channel sensing priority which is determined according to a relative position of a geographical cell to which the sensing wireless connection device itself belongs, and a leader wireless connection device which is located within the zone and in a position which is geographically closest to a geographical center of the zone, and transmits a channel information request message to other wireless connection devices of the zone.

The sensing wireless connection device may check a cell of a network to which the sensing wireless connection device belongs by using geographical location information of the sensing wireless connection device and geographical location information of the zone.

The zone and the cell may be partitioned as square areas, and the sensing wireless connection device, which belongs to 4 edge cells which are located at an apex area of the zone from among the cells, may have a highest sensing priority.

A sensing wireless connection device, which belongs to a border cell which is adjacent to only one of boundaries of the zone from among the cells, may have a second highest sensing priority followed by the sending wireless connection device which belongs to the edge cell, and the sensing wireless connection device, which belongs to the border cell, may perform channel sensing when a sensing wireless connection device does not exist in a neighboring edge cell.

The leader wireless connection device may multicast channel sensing information, which is generated by channel information which is received from another wireless connection device within the zone, to at least one wireless connection device within the zone, and the wireless connection device, which receives the channel sensing information from the leader wireless connection device, may transmit the channel sensing information to another wireless connection device within the zone.

In accordance with yet another aspect of the present invention, a wireless connection device for performing distributed channel sensing in a wireless network includes a location checking unit which checks a location of the wireless connection device, a channel information generating unit which determines whether the wireless connection device is located within a predetermined geographical zone of a wireless network which logically partitions the wireless network, and collects channel information by performing channel sensing according to a channel sensing priority which is determined according to a relative position of a geographical cell to which the wireless connection device itself belongs within the zone, and a transmitting unit which transmits the collected channel information to another node.

DETAILED DESCRIPTION OF THE EMBODIMENTS

Figure 1:
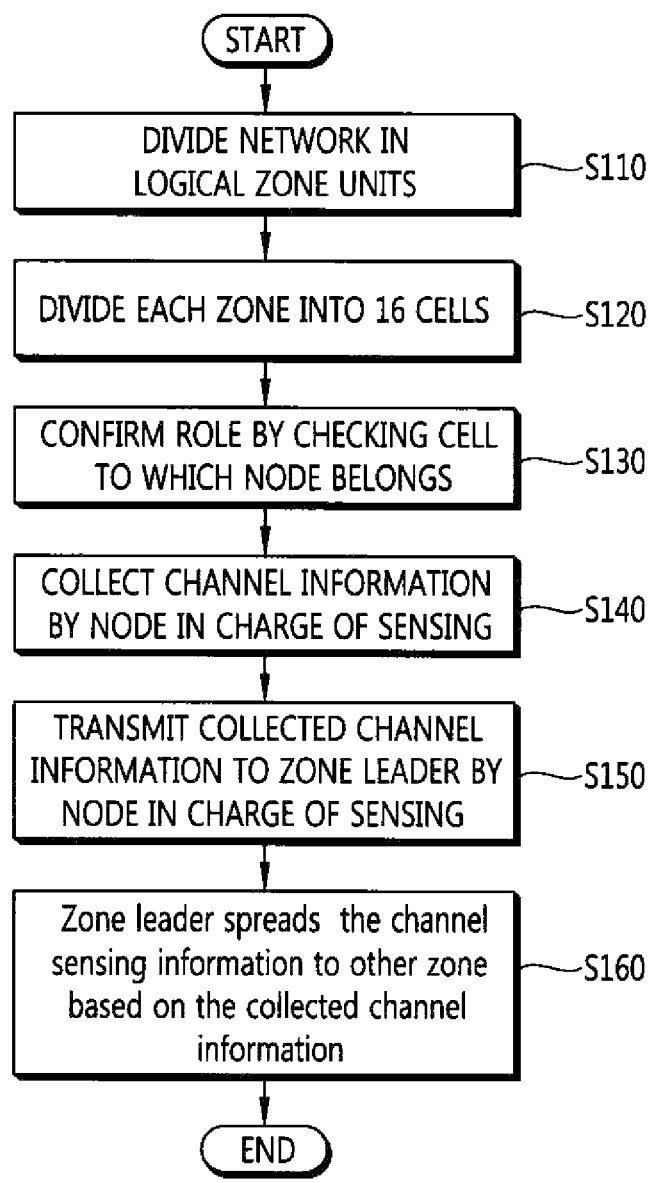
FIG. 1 is a flowchart illustrating a distributed channel sensing method according town embodiment of the present invention.

The present invention may be variously changed and may have various embodiments, and thus here some of the embodiments will be illustrated and explained in detail.

However, this is not to limit the present invention to specific embodiments, but it should be understood that the present invention includes all changes, equivalents, and substitutes within the concept and technology of the present invention.

The terms such as "first" and "second" may be used in explaining various elements, but the elements should not be limited by the terms. The terms are used only to distinguish one element from another. For example, a first element may be referred as a second element while not going beyond the scope of the rights of the present invention, and in a similar manner, the second element may be referred to as the first element. The expression "and/or" includes a combination of a plurality of related items or one of the items.

When an element is mentioned as being "connected" to another element, it may mean that the element is directly connected to another element, but there may be another element between the elements. In contrast, when an element is mentioned as being "directly connected" to another element, it should be understood that there is no other element between the elements.

The terms used in the present application are used only to explain some elements and are not used to limit the present invention. A singular express includes a plural expression unless clearly stated otherwise. In the present specification, it should be understood that terms such as "include" and "have" are used to explain the existence of characteristics, numbers, steps, operations, elements, parts, and a combination thereof, but the terms do not exclude the possibility of addition of one or more characteristics, numbers, steps, operations, elements, parts, and a combination thereof.

Unless defined otherwise, all terms used here including technical or scientific terms have the same meaning as what is generally understood by one of ordinary skill in the art. Generally used, predefined terms should be understood to have the meaning which coincides with the meaning in the context of the related art, and unless clearly defined, the terms should be not understood in an excessively formalistic manner.

Hereinafter, embodiments of the present invention will be described in detail. The same reference numeral is used for the same element in drawings, and the redundant description on the same element is omitted.

The distributed channel sensing method which is performed in the distributed channel sensing system according to an embodiment of the present invention logically divides the network into the zone including 16 cells based on the sensing range of the node to reduce the overhead on the channel sensing and generates an available channel and common channel list of the zone after the zone leader at the center of the zone collects the channel information which is sensed by the node at a specific cell within each zone. The zone leader multicasts the generated available channel and common channel list of the zone to nodes within the zone. The node, which receives at least one of the available channel and common channel lists of the zone from the zone leader, transmits the available channel and common channel list of the zone to another node within the zone. The node may transmit the available channel and common channel list of the zone to a node which has not received the list. As such, the available channel and common channel lists of the zone become flooded within the zone.

FIG. 1 is a flowchart illustrating a distributed channel sensing method according to an embodiment of the present invention. First, the distributed channel sensing system divides the network in logical zone units (S110). Thereafter, the distributed channel sensing divides each zone into 16 cells (S120). Thereafter, the node checks the cell to which the node itself belongs and checks the node's own role for distributed channel sensing (S130). Thereafter, the node in charge of sensing collects channel information according to the checked role (S140). Thereafter, the node in charge of sensing transmits the collected channel information to the zone leader (S150). Thereafter, the zone leader spreads the channel sensing information of the zone to other nodes within the zone based on the collected channel information (S160).

Figure 2:
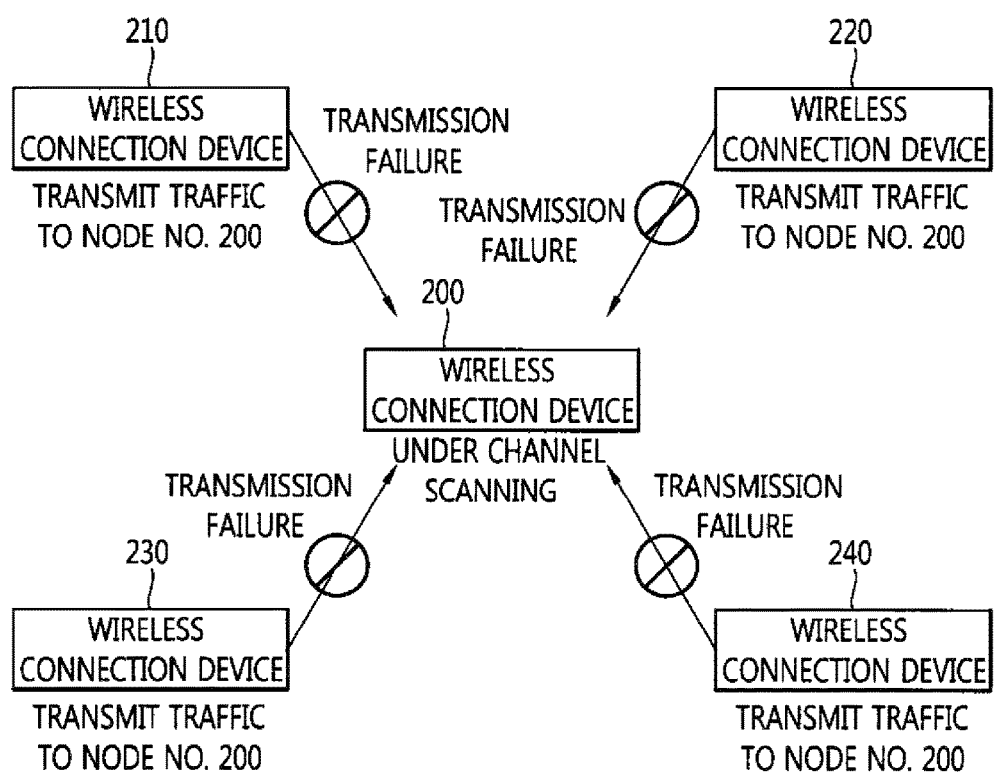
FIG. 2 illustrates a wireless multi-hop environment where a distributed channel sensing method is performed according to an embodiment of the present invention.

FIG. 2 illustrates a wireless multi-hop environment where a distributed channel sensing method is performed according to an embodiment of the present invention. Referring to FIG. 2, each radio connection device 200, 210, 220, 230, or 240 periodically scans the channel to measure the state of the frequency in a cognitive radio environment. At this time, communication between respective nodes is disconnected during the time when the scanning is performed, and communication is possible only when nodes, which desire communication, are not in the sensing state. As in FIG. 2, another radio connection device 210, 220, 230, or 240 within the transmission range of the connection device 200 cannot communicate with the connection device 200 while a specific radio connection device 200 performs sensing, and the transmission delay time increases.

Figure 3:
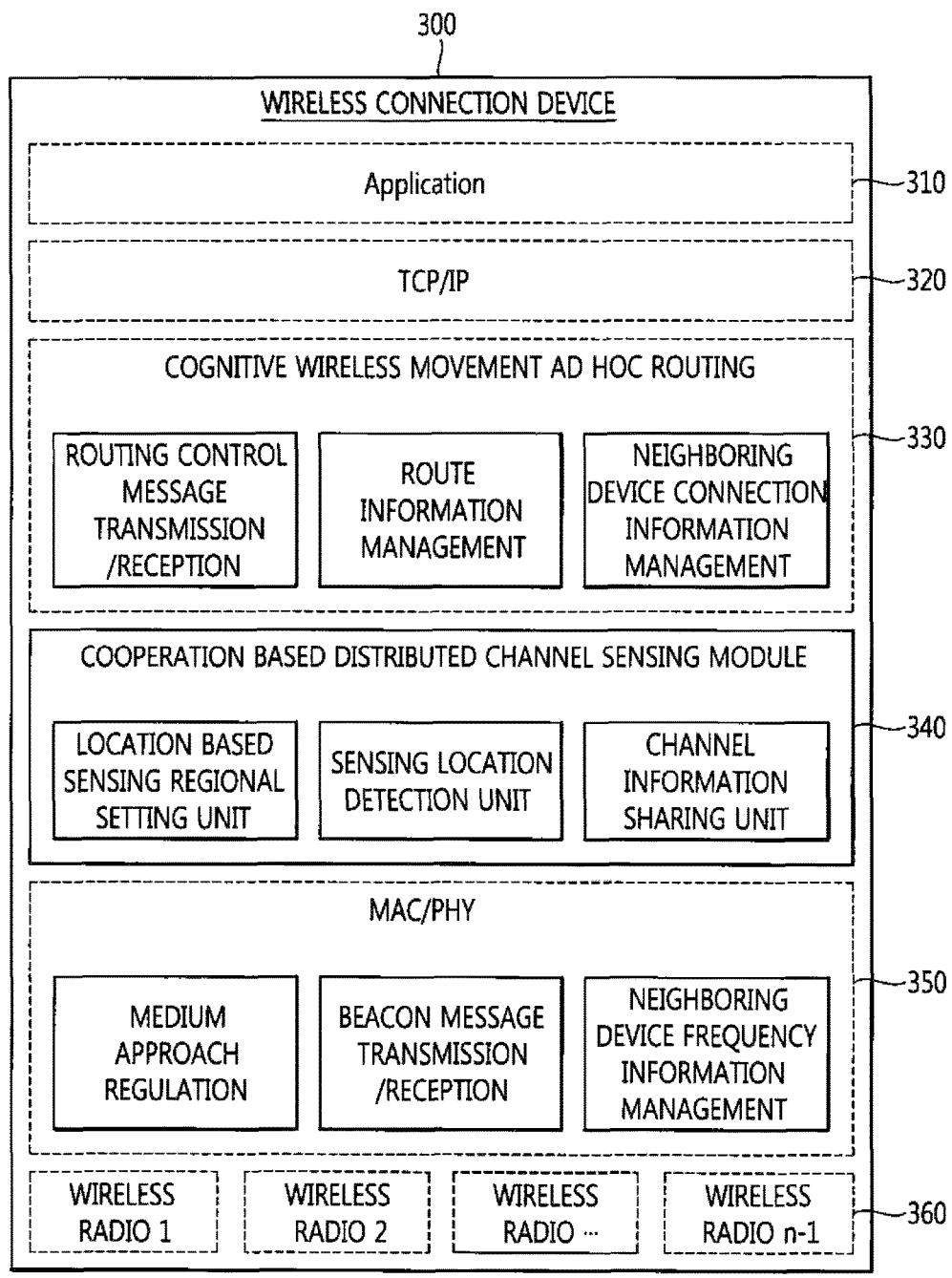
FIG. 3 is a hierarchical diagram of a radio connection device according to an embodiment of the present invention.

FIG. 3 is a hierarchical diagram of a radio connection device according to an embodiment of the present invention. The radio connection device where the present invention is performed may be divided into 5 layers of the network. The 5 layers include an application layer 310, a TCP/IP layer 320, a cognitive radio movement ad hoc routing layer 330, a MAC/PHY layer 350, and a wireless radio 360. The cooperation-based distributed channel sensing module 340, which is configured for distributed channel sensing, may be used between the cognitive radio movement ad hoc routing layer 330 and the MAC layer 350.

The cooperation-based distributed channel sensing module 340 includes a location-based channel sensing local setting unit which checks the zone where the channel sensing is performed according to the location of the radio connection device, a sensing location detection unit which checks the cell where the channel sensing is performed according to the location of the radio connection device and detects the distributed channel sensing role of the radio connection device, and a channel information sharing unit which shares channel information by the multi-hop through a control message.

Figure 4:
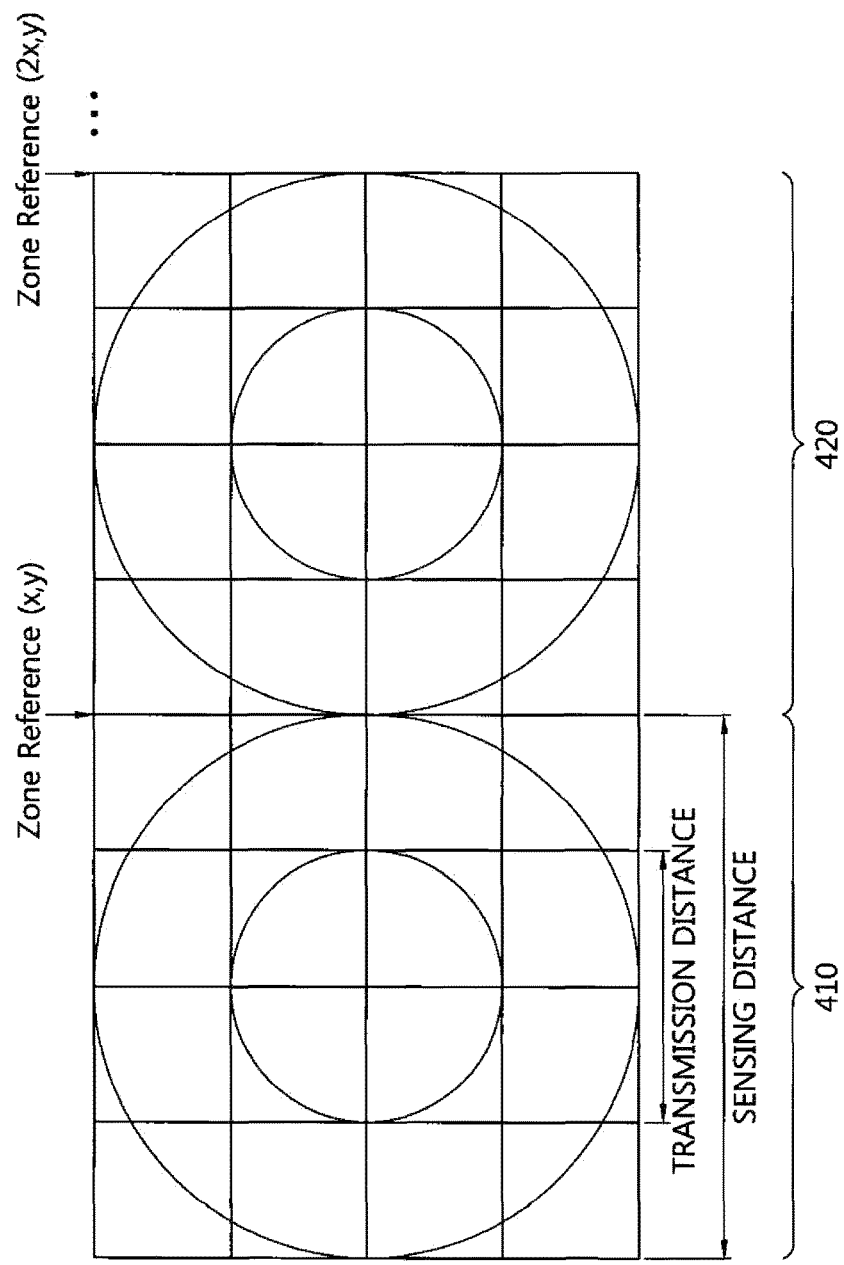
FIG. 4 illustrates regional information which is logically divided according to a distributed channel sensing method according to an embodiment of the present invention.

FIG. 4 illustrates regional information which is logically divided according to a distributed channel sensing method according to an embodiment of the present invention. FIG. 4 illustrates 2 zones 410 and 420. The first zone includes ZoneReference (x, y), and the second zone includes ZoneReference (2x, y). The distributed channel sensing method according to an embodiment of the present invention first divides the network into the zones of the sensing range size of the node in order to efficiently search for the available channels and common channels of the network. The size of each zone is determined by the sensing range of the node. The reference coordinates for determining each node's own location within the zone are determined by reflecting the maximum sensing range of the zone. For example, referring to FIG. 4, the reference coordinates of the first zone are represented by ZoneReference (x, y), and each x and y are determined as the maximum sensing range of the first zone. The reference coordinate of the second zone is represented by ZoneReference (2x, y), and each 2x, y are determined as the maximum sensing range of the second zone.

Figure 5:
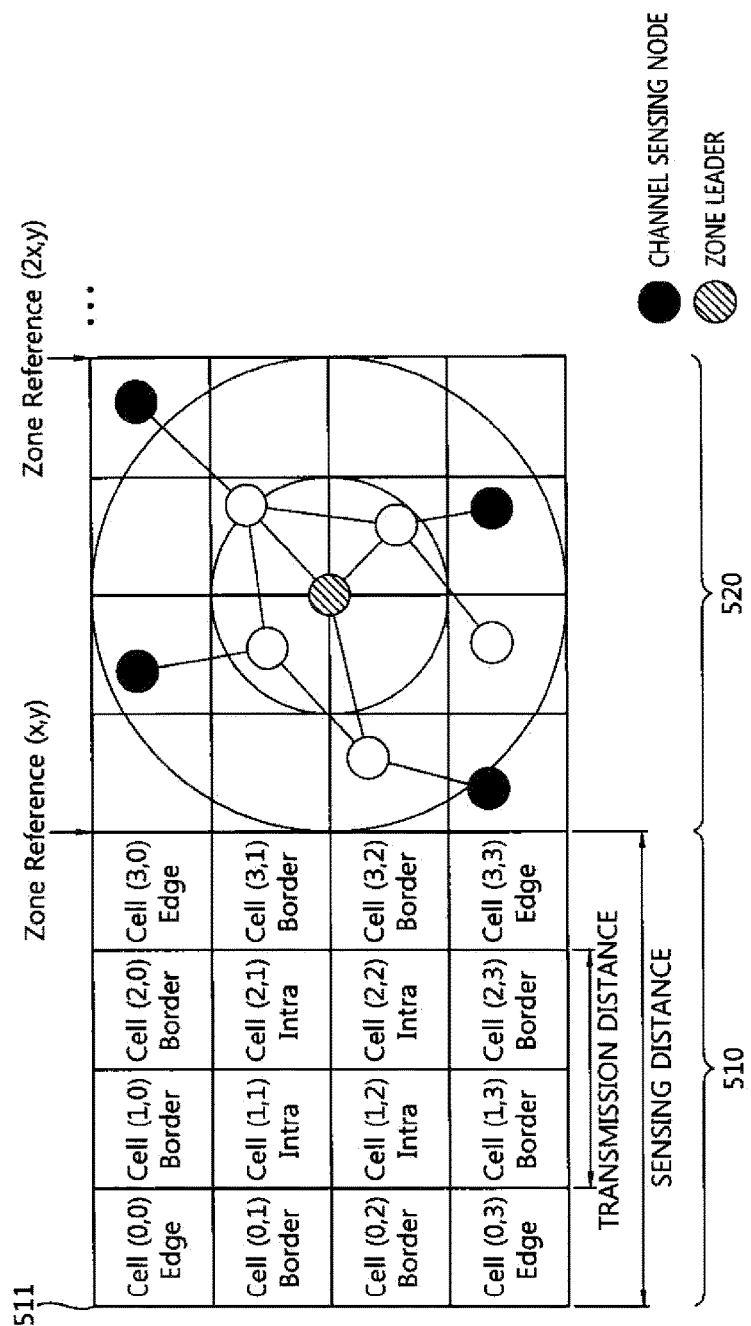
FIG. 5 illustrates a distributed channel sensing system according to a distributed channel sensing method according to an embodiment of the present invention.

FIG. 5 illustrates a distributed channel sensing system according to a distributed channel sensing method according to an embodiment of the present invention. FIG. illustrates two zones 510 and 520. The first zone 510 illustrates the types of cells which have the ZoneReference (x, y) as the reference coordinate and belong to the first zone. The second zone illustrates the arrangement of cells and nodes which have the ZoneReference (2x, y) as the reference coordinate and belong to the second zone. The distributed channel sensing system according to an embodiment of the present invention includes a plurality of nodes. A node is a radio connection device and refers to a radio connection device which performs wireless communication with other nodes. As the node performs roles which are determined according to the type of the cell to which the node itself belongs in the zone which partitions the wireless network, the distributed channel sensing is performed in the distributed channel sensing system.

Referring to FIG. 5, the wireless network is partitioned into geographical zones, and the zone is partitioned into 16 geographical cells having the channel sensing role. Each node within the zone may check the cell to which the node itself belongs in the zone by using equation 1 and equation 2 below. Equation 1 below indicates the length of one side of a cell having a square shape. The length of the cell is determined as the half of the maximum transmission distance (communication range) of the node in order to reduce inter-node connection of the adjacent cell and redundancy of the channel sensing range.

$$\text{Cell Length} = \text{Communication Range}/2 \quad \text{[Equation 1]}$$

Each node within the network may calculate the ID of the cell where the node itself is located based on the ZoneReference which is the reference point of the zone where the node itself is located by using the equation 2 below. In equation 2 below, Location (x, y) is the current location of each node which is obtained through GPS, etc., and the CellID (a, b) of the coordinates where each node is located is calculated based on the ZoneReference.x and ZoneReference.y information and the maximum length of the cell. In equation 2 below, "a" is a value which is 0 or greater and a value less than 4. "b" is a value which is 0 or greater and a value less than 4.

$$CellID(a, b) \begin{cases} a = \left\lfloor \dfrac{(Location \cdot x - ZoneReference \cdot x)}{CellLength} \right\rfloor \\ b = \left\lfloor \dfrac{(Location \cdot y - ZoneReference \cdot y)}{CellLength} \right\rfloor \end{cases} \quad \text{[Equation 2]}$$

For example, ZoneReference.x and ZoneReference.y which are smallest GPS location coordinate values in the first zone may be obtained. This may be obtained by using the reference coordinate ZoneReference (x, y) in the first zone 510. Referring to the example of FIG. 5, the apex 511 at the upper right side of the first zone has the smallest coordinate value in the first zone.

Value a, which is the x-axis identifier of the cell where the node is positioned, may be obtained by using the value which is obtained by subtracting the ZoneReference.x value of the first zone from x-coordinate of the current location of the node and dividing the length of one side of the cell. In the same manner, value b, which is the y-axis identifier of the cell where the node is positioned, may be obtained by using the value which is obtained by subtracting ZoneReference.y value of the first zone from the y-coordinate of the current location of the node and dividing the length of one side of the cell.

16 cells are divided into the edge, border, intra, and cell according to the region within the zone, and the priority of the channel sensing is determined in order. For example, the channel sensing priority of the sensing node becomes different at relative positions of the geographical cell to which the sensing node itself belongs within the zone which logically divides the wireless network, and the sensing node collects channel information by performing channel sensing according to the determined channel sensing priority. For example, the edge cell has the highest channel sensing priority, and then the border cell has the second highest channel sensing priority, and the intra cell has the lowest channel sensing priority.

CellIDn (a, b) of node n is calculated through equation 2, and each node determines the type of the cell where the node itself is positioned as one of the edge, intra, and border cell according to the equation 3 below.

$$CellType \begin{cases} Edge & \text{if } CellID_n \in \{(0, 0), (3, 0), (0, 3), (3, 3)\} \\ Intra & \text{else } CellID_n \in \{(1, 1), (2, 1), (1, 2), (2, 2)\} \\ Border & \text{otherwise} \end{cases} \quad \text{[Equation 3]}$$

The types of the cells within one zone may be determined according to the above method as illustrated in the first zone 510 of FIG. 5.

The edge cell is the cell with the highest sensing priority and the node which is positioned at the cell periodically senses the entire cells, and includes the information in the reply message of the join request to the multi-cast which is periodically flooded from the zone leader so as to be transmitted.

The node of the border cell performs the sensing roll when there is no neighboring node which is located in the edge cell, and the intra cell senses the channel when there is no node in the neighboring border cell or edge cell.

The node, which is located at the center of the intra cell, is selected as the zone leader for integrating the channel information of the zone. For example, the zone leader is positioned within the zone and may be a wireless connection device which is positioned at the position which is geographically closest from the geographical center of the zone.

The zone leader transmits the channel information request message to other nodes within the zone. The zone leader may transmit the channel information request message to a plurality of nodes, and the node, which has received the channel information request message, may transmit the channel information request message to other nodes which are connected to the node itself. The zone leader may use the join request to the multi-cast as the channel information request message. The zone leader may receive channel information from other nodes within the zone in response to the channel information request message.

The zone leader, which receives channel information detected in each cell, generates the available channel list which may be commonly used by all nodes within the zone and selects a common channel. Further, the zone leader may include at least one of the generated available channel list and the selected common channel in the join request message and transmits the join request message. The join request message may be flooded only within the zone. To this end, the join request message may be transmitted to only the nodes which belong to the zone as the join request message includes information of the zone.

The channel sensing information is transmitted by the periodic multicast message which is generated from the zone leader, the multicast control packet is used, and the format of the control message, which is used in the existing multicast routing scheme such as ODMRP, may be utilized.

The zone leader periodically spreads the multicast subscription request message into the zone, and the message contains channel information which is collected by the leader node from the sensing node. Each node within the network receives only the message which is generated in the region where the node itself is positioned based on the region information of the leader node which is indicated in the message.

The sensing node periodically performs the channel scanning process and collects the channel information of the region. The collected information is contained in the response message when the join request message arrives from the zone leader and is then transmitted. The response message, which is transmitted by the sensing node, may be promptly transmitted to the zone leader or may be transmitted to the zone leader via a general node. For example, the response message, which is transmitted by the sensing node, may be transmitted to the zone leader along the path at which the join request message has been received from the zone leader.

The common node, which does not perform the role of the zone leader and the sensing node, from among the nodes which belong to the zone, only responds to the multicast subscription request message which is transmitted from the zone leader and does not transmit separate channel information. Only, the general node may transmit the channel information request message, which is received from the zone leader, to the sensing node or other general nodes toward the sensing node. Further, a general node may transmit the channel information, which is received from the sensing node, to the zone leader or other general nodes toward the zone leader. Through the above process, the channel information of the zone may be shared by all nodes.

Figure 6:
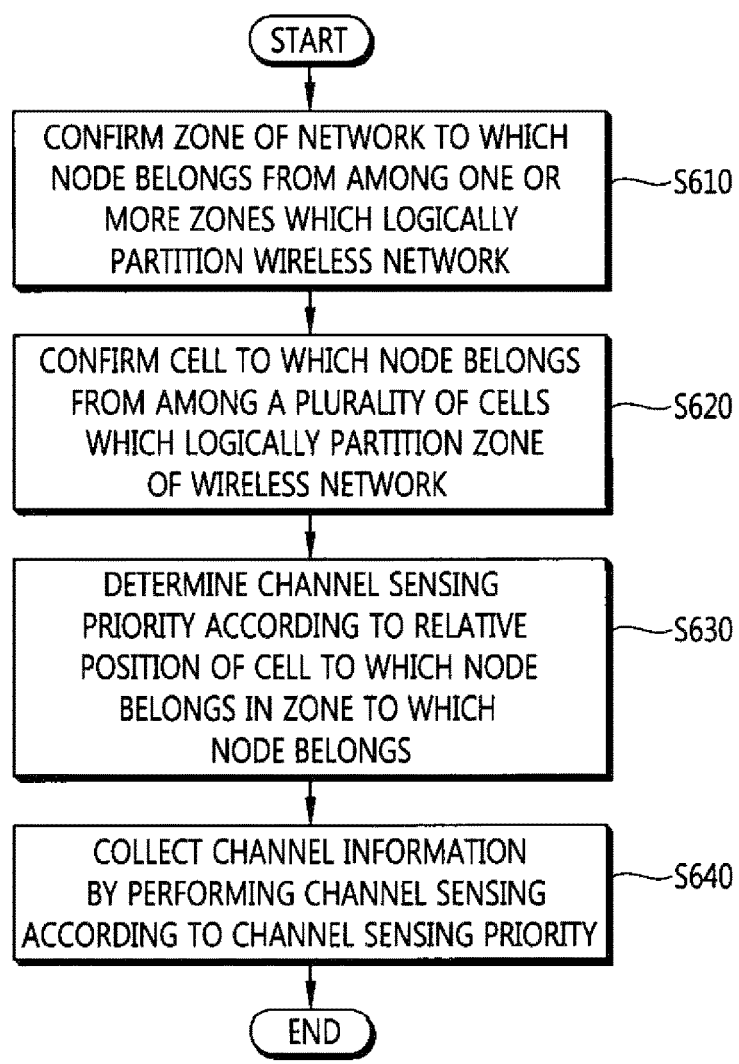
FIG. 6 is a flowchart illustrating a distributed channel sensing method which is performed by a node in a distributed channel sensing system according to an embodiment of the present invention.

FIG. 6 is a flowchart illustrating a distributed channel sensing method which is performed by a node in a distributed channel sensing system according to an embodiment of the present invention. The node is a wireless connection device and performs wireless connection with other nodes. The zone information and cell information of the network may use a preset value, may be received from the control node which forms the zone and cell of the network, or may be inputted from the user. The zone includes 16 cells, and the cell may partition the zone by 4×4 array within the zone.

First, the node checks the network zone to which the node belongs from among one or more zones which logically partition the wireless network (S610). The node may check the network zone to which the node belongs by using the node's location information and the zone's geographical location information. The geographical location information of the zone may include the criterion location and size information of the zone.

Thereafter, the node checks the cell to which the node belongs from among a plurality of cells which logically partition the zone of the wireless network (S620). The node may check the cell of the network to which the node belongs by using the node's geographical location information and the zone's geographical location information. For example, the nodes may subtract the reference position of the zone from the node's own position for each of the x-coordinate and y-coordinate and specify the cell to which the node itself belongs as each quotient for the x-coordinate and y-coordinate which is obtained by dividing the subtracted result by the length of the next cell.

Thereafter, the channel sensing priority is determined according to the relative position of the cell to which the node belongs in the zone to which the node belongs (S630). The zone and the cell may be partitioned as square regions. The node, which belongs to any one of 4 edge cells which are located at the apex area of the zone in the cell, has the highest priority so as to perform channel sensing. The cell, which is adjacent to any one of boundaries from among the boundaries of the zone in the cells, is a border cell, and the node which belongs to the border cell has the second highest sensing priority followed by the node which belongs to the edge cell. The node, which belongs to the border cell, performs channel sensing when the node does not exist in the neighboring edge cell.

The node, which belongs to the intra cell which is not adjacent to the border of the zone, has the lowest sensing priority, and the node, which belongs to the intra cell, performs channel sensing when a nodes does not exist in the neighboring edge cell and border cell. Thereafter, the node collects channel information by performing channel sensing according to the channel sensing priority (S640).

The zone and the cell may be partitioned in regions of a form other than square. In such a case, the edge cell may not exist. For example, when the zone and the cell are partitioned in a round shape, the apex does not exist in the zone, and thus an edge cell may not exist. In such a case, the border cell, which is adjacent to one of borders, from among the borders of the zone, may perform channel sensing with the highest sensing priority. The node, which belongs to the intra cell which is not adjacent to the border of the zone, has the lowest sensing priority. The node, which belongs to the intra cell, may perform channel sensing when the node does not exist in the neighboring border cell.

Figure 7:
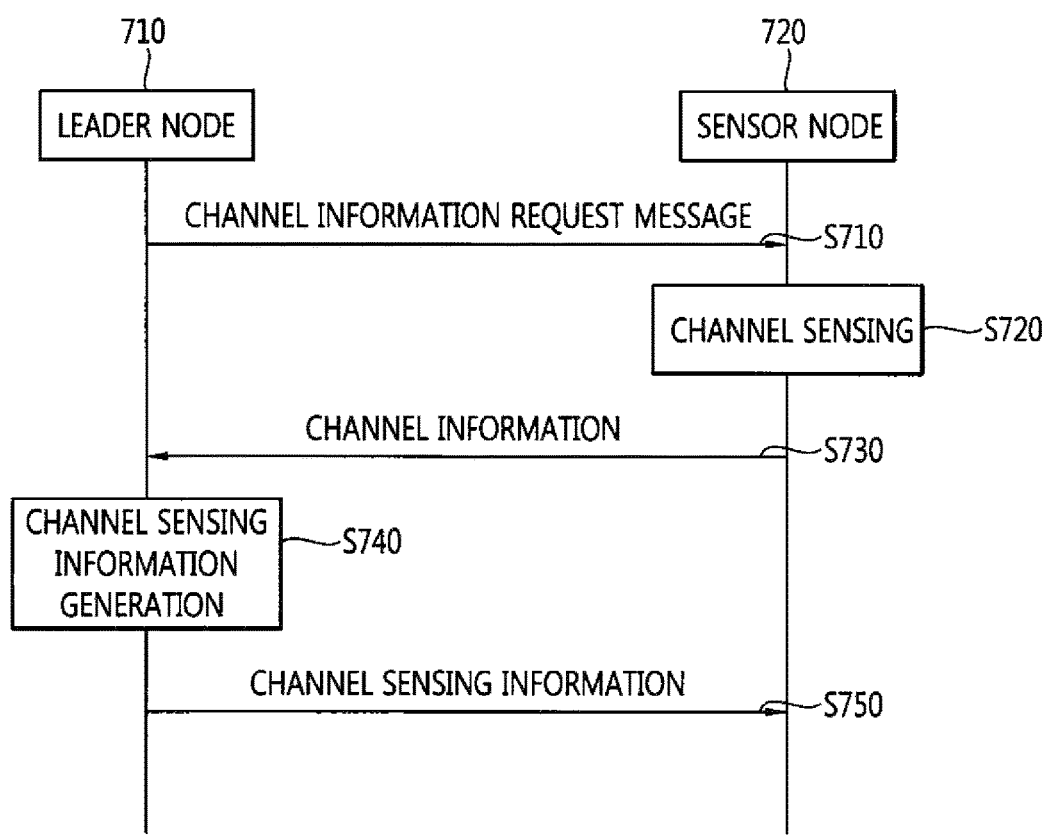
FIG. 7 is a flowchart illustrating a method of collecting channel information which is performed by a leader node and a sensor node in a distributed channel sensing system according to an embodiment of the present invention.

FIG. 7 is a flowchart illustrating a method of collecting channel information which is performed by a leader node and a sensor node in a distributed channel sensing system according to an embodiment of the present invention. The leader node 710 is a wireless connection device which performs the role of the zone leader and may select the wireless connection device in the geographically closest position in the geographically central position as the leader node. The sensor node 720 is a node which belongs to the edge, intra, and border cell and is a wireless connection device which performs channel sensing according to the priority of the cell to which the sensor node 720 belongs.

First, the leader node 710 transmits a channel information request message to the sensor node 720 (S710). For example, the leader node 710 may transmit a channel information request message to another node which belongs to the zone. The leader node 710 may use the join request message as the channel information request message. The node, which receives the channel information request message, may transmit the channel information request message to other nodes within the zone.

Thereafter, the sensor node 720 performs channel sensing (S720). When receiving the channel information request message from the leader node 710, the sensor node 720 may perform channel sensing according to the determined channel sensing priority so as to collect channel information. Thereafter, the sensor node 720 transmits the collected channel information to the leader node 710 (S730). The sensor node 720 may include the collected channel information in the response message to the join request message from the leader node 710 and transmit the channel information to the leader node 710.

Thereafter, the leader node 710 generates channel sensing information by using the channel information which is received from the sensor node 720 (S740). For example, the leader node 710 generates an available channel list which may be commonly used by all nodes within the zone and selects a common channel, and generates at least one of the generated available channel list and the selected common channel as channel sensing information.

Thereafter, the leader node 710 transmits the channel sensing information which is generated as the sensor node 720 (S750). The leader node 710 may multicast the channel sensing information to at least one of the nodes in the zone. The leader node 710 may transmit the generated channel sensing information after including the channel sensing information in the join request message. The node, which receives the channel sensing information from the leader node 710, transmits the channel sensing information to another node within the zone so that the channel sensing information may be flooded within the zone. The channel sensing information contains regional information and may be transmitted only the node which belongs to the zone. The channel sensing information may contain time information and may be transmitted between nodes only for a certain amount of time. The node, which receives the channel sensing information, may transmit the channel sensing information to other nodes within the zone which have not received the channel sensing information.

Figure 8:
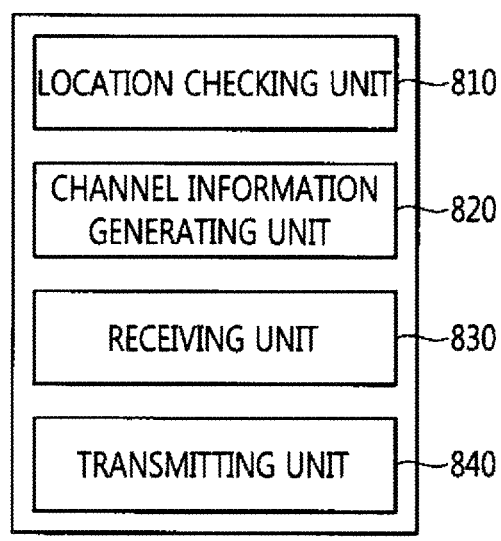
FIG. 8 is a block diagram of a radio connection device which performs a distributed sensing method according to an embodiment of the present invention.

FIG. 8 is a block diagram of a radio connection device which performs a distributed sensing method according to an embodiment of the present invention. A wireless connection device which performs a distributed channel sensing method according to an embodiment of the present invention includes a location checking unit 810, a channel information generating unit 820, a receiving unit 830, and a transmitting unit 800.

The location checking unit 810 checks the location of the wireless connection device. For example, the location checking unit 810 checks the location of the wireless connection device by checking GPS information of the wireless connection device.

The channel information generation unit 820 generates channel information by performing channel sensing through channel scanning when the wireless connection device is a sensor node. For example, the channel information generating unit 820 may collect channel information by determining whether a wireless connection device exists in a preset geographical zone of the wireless network which logically partitions the wireless network and performing channel sensing according to the channel sensing priority which is determined according to the relative position of the geographical cell to which the wireless connection device belongs in the zone.

Furthermore, when the wireless connection device is selected as the leader node, the channel information generation unit 820 generates the channel sensing information by using the channel information which is received from the sensor node through the receiving unit 830. For example, the channel information generation unit 820 may generate at least one of the available channel list and the common channel list as channel sensing information by using channel information which is received from the sensor node. The channel information generation unit 820 may generate the available channel list which may be commonly used by all nodes within the zone by using the channel information which is received from the sensor node, and may select a common channel.

The receiving unit 830 receives data from other wireless connection devices. When the wireless connection device is the sensor node, a channel information request message is received from the leader node. The channel information request message may be included in the join message so as to be received. When the wireless connection device is the leader node, the receiving unit 830 receives the channel information from the sensor node. The channel information may be included in the response message for the join message so as to be received.

The transmitting unit 840 transmits data to other wireless connection devices. When the wireless connection device is the sensor node, the transmitting unit 840 transmits channel information to the leader node. The channel information may be included in the response message for the join message which is received from the leader node so as to be transmitted. When the wireless connection device is the leader node, the transmitting unit 840 transmits the channel information request message to the sensor node. The channel information request message may be included in the join message so as to be transmitted.

According to a method and system for performing distributed channel sensing according to embodiments of the present application, channel information is collected by performing channel sensing according to a channel sensing priority which is determined according to a relative position of a cell to which a wireless connection device belongs from among a plurality of cells which logically partition the zone of the wireless network, and thus the overhead of the channel sensing which is generated in a cognitive wireless multi-hop network environment is reduced, and the transmission failure which occurs when the wireless connection device detects frequencies is reduced.

In the above description, the present invention was described based on a series of functional blocks, but the present invention is not limited by the above-described embodiments and attached drawings, and may be substituted, modified, and changed within the scope of the technical concept of the present invention.

The combination of the above-described embodiments is not limited by the above-described embodiments, and various combinations may be provided as necessary.

In the above-described embodiments, the methods are described based on the flowchart as a series of, operations or blocks, but the present invention is not limited to the order of operations, and some operations may occur in other operations or in a different order. Further, it would be understood by one of ordinary skill in the art that the operations in the flowchart are not exclusive and other operations may be included, and one or more operations in the flowchart may be deleted without affecting the scope of the present invention.

The above-described embodiments include various forms of examples. It is not possible to describe all possible combinations to indicate various forms, but one of ordinary skill in the art would recognize possibility of other combinations. Hence, the present invention includes all other changes and modifications.

What is claimed is:

1. A method of distributed channel sensing by a wireless connection device which belongs to a wireless network, the method comprising:
   checking a zone of a network, to which the wireless connection device belongs, from among one or more zones which logically partition the wireless network;
   checking a cell, to which the wireless connection device belongs, from among a plurality of cells which logically partition the zone of the wireless network;
   determining a channel sensing priority according to a relative position of the cell, to which the wireless connection device belongs, in the zone to which the wireless connection device belongs; and
   collecting channel information by performing channel sensing according to the channel sensing priority.

2. The method of claim 1, wherein checking the cell to which the wireless connection device belongs comprises:
   checking the cell of the network to which the wireless connection device belongs by using geographical location information of the wireless connection device and geographical location information of the zone.

3. The method of claim 1, wherein the zone includes 16 cells, and the cell partitions the zone by a 4×4 array within the zone.

4. The method of claim 1, wherein the wireless connection device, which belongs to an edge cell which is located in an apex area of the zone from among the cells, has a highest sensing priority.

5. The method of claim 4,
   wherein a wireless connection device, which belongs to a border cell which is adjacent to one of boundaries of the zone from among the cells, has a second highest sensing priority which is lower in sensing priority than the wireless connection device which belongs to the edge cell,
   wherein the wireless connection device which belongs to the border cell performs channel sensing when another wireless connection device does not exist in a neighboring edge cell.

6. The method of claim 5,
wherein a wireless connection device, which belongs to an intra cell which is not adjacent to a boundary of the zone, from among the cells, has a lowest sensing priority,
wherein the wireless connection device which belongs to the intra cell performs channel sensing when another wireless connection device does not exist in the neighboring edge cell and the border cell.

7. The method of claim 1, wherein a leader wireless connection device of the zone which is located geographically closest to a geographical center of the zone transmits a channel information request message to other wireless connection devices which belong to the zone.

8. The method of claim 7, wherein the leader wireless connection device of the zone generates channel sensing information by using channel information which is received from another wireless connection device within the zone.

9. The method of claim 8, wherein the leader wireless connection device multicasts the channel sensing information to at least one wireless connection device within the zone.

10. The method of claim 9, wherein the wireless connection device, which receives the channel sensing information from the leader wireless connection device, transmits the channel sensing information to another wireless connection device within the zone.

11. The method of claim 1, wherein a size of the zone is determined by using a sensing range of the wireless connection device.

12. The method of claim 1, wherein a size of the cell is determined by using the maximum transmission distance of the wireless connection device.

13. The method of claim 1, wherein collecting the channel information by performing channel sensing according to the channel sensing priority comprises:
receiving a channel information request message from a leader wireless connection device of the zone; and
collecting channel information by performing channel sensing according to the determined channel sensing priority.

14. The method of claim 13, wherein collecting channel information by performing channel sensing according to the channel sensing priority comprises:
transmitting the collected channel information to the leader wireless connection device of the zone.

15. A system for performing distributed channel sensing in a wireless network, the system comprising:
a sensing wireless connection device which is located within a predetermined geographical zone of the wireless network which logically partitions the wireless network, and collects channel information by performing channel sensing according to a channel sensing priority which is determined according to a relative position of a geographical cell to which the sensing wireless connection device itself belongs; and
a leader wireless connection device which is located within the zone and in a position which is geographically closest to a geographical center of the zone, and transmits a channel information request message to other wireless connection devices of the zone.

16. The system of claim 15, wherein the sensing wireless connection device checks a cell of a network to which the sensing wireless connection device belongs by using geographical location information of the sensing wireless connection device and geographical location information of the zone.

17. The system of claim 15, wherein the zone and the cell are partitioned as square areas, and the sensing wireless connection device, which belongs to 4 edge cells which are located at an apex area of the zone from among the cells, has a highest sensing priority.

18. The system of claim 17,
wherein the sensing wireless connection device, which belongs to a border cell which is adjacent to only one of boundaries of the zone from among the cells, has a second highest sensing priority which is lower in sensing priority than the sending wireless connection device which belongs to the edge cell, and the sensing wireless connection device, which belongs to the border cell, performs channel sensing when another sensing wireless connection device does not exist in a neighboring edge cell.

19. The system of claim 15, wherein the leader wireless connection device multicasts channel sensing information, which is generated by channel information which is received from another wireless connection device within the zone, to at least one wireless connection device within the zone, and the wireless connection device, which receives the channel sensing information from the leader wireless connection device, transmits the channel sensing information to another wireless connection device within the zone.

20. A wireless connection device for performing distributed channel sensing in a wireless network, the wireless connection device comprising:
a location checking unit which checks a location of the wireless connection device;
a channel information generating unit which determines whether the wireless connection device is located within a predetermined geographical zone of the wireless network which logically partitions the wireless network, and collects channel information by performing channel sensing according to a channel sensing priority which is determined according to a relative position of a geographical cell to which the wireless connection device itself belongs within the zone; and
a transmitting unit which transmits the collected channel information to another node.

* * * * *